United States Patent [19]

Blench et al.

[11] 4,095,659

[45] Jun. 20, 1978

[54] DEFLECTION-RESTRAINED LOAD CELL FOR ON-BOARD VEHICLE WEIGHING SYSTEMS

[75] Inventors: Carl Blench, Stanwood; Carl R. Harris, Kirkland, both of Wash.

[73] Assignee: Eldec Corporation, Lynnwood, Wash.

[21] Appl. No.: 694,652

[22] Filed: Jun. 10, 1976

[51] Int. Cl.² ............................................ G01G 19/12
[52] U.S. Cl. ................................ 177/136; 73/141 A; 177/154; 177/211
[58] Field of Search ............... 177/136, 154, 157, 211, 177/229, 255; 73/141 A

[56] References Cited

U.S. PATENT DOCUMENTS

| 2,720,111 | 10/1955 | Clark | 177/211 X |
| 2,981,100 | 4/1961 | Johnson | 177/211 X |
| 3,661,220 | 5/1972 | Harris | 177/136 |

Primary Examiner—Joseph W. Hartary
Attorney, Agent, or Firm—Christensen, O'Connor, Johnson & Kindness

[57] ABSTRACT

A problem that is often encountered under uneven terrain conditions with on-board load weighing systems for vehicles, such as logging trucks, having a frame member and a load support member to which a load which is to be measured is applied, is that structural failures occur in the load cell assemblies included in the on-board load weighing system. The cause of these structural failures is traced to rotation of the load cell assemblies resulting in undue tensive forces in the load cells thereof. Various restraining devices are discussed for limiting the upward deflection of an upper, load concentrating portion of the load cell to maintain the tensive forces within acceptable levels.

8 Claims, 17 Drawing Figures

DEFLECTION-RESTRAINED LOAD CELL FOR ON-BOARD VEHICLE WEIGHING SYSTEMS

FIELD OF THE INVENTION

This invention generally relates to on-board vehicle load weighing systems utilizing strain-gage instrumented load cells, and, more particularly, to such systems in which the load cell is partially restrained from deflection in order to minimize cell breakage.

BACKGROUND OF THE INVENTION

On-board load weighting systems for vehicles such as logging trucks are well-known to the prior art. An example of such a system is that disclosed and claimed in U.S. Pat. No. 3,661,220, May 9, 1972, Harris, and assigned to the assignee of the present invention. A plurality of load cell bodies, each consisting of a machined rectangular steel block, are supported between load-carrying members and tractor and trailer frames of the logging truck. In each load cell body there is formed first and second end slots which serve to direct the load, applied by the load-carrying member to a top surface of the load cell body, to a central portion of the load cell body and also, in conjunction with means supporting the load cell body above the tractor or trailer frame, to define first and second beams which are accordingly deflected in response to the load. The amount of stress in the first and second beams is measured by strain gages located along a longitudinal surface of the load cell body which, when connected in an appropriate circuit, provide an output signal proportional to the amount of applied load.

Systems of the type described in the aforementioned Harris patent have met with considerable commercial success in the logging truck industry, inasmuch as such systems provide highly accurate and repeatable measurements of logging loads under adverse terrain and environmental conditions. However, such systems have been subject to a number of malfunctions in actual operation resulting from cracks appearing in, and other structural failures of, the load cell body. Because logging trucks in operation encounter severe off-road terrain conditions, it was first thought that these structural failures were due to inadequate strength in the load cell body. Although the number and frequency of occurrence of load cell structural failures was reduced by redesign and strengthening of the load cell body, such structural failures continued to occur in sufficient numbers to present a serious problem inasmuch as any such structural failure requires replacement of the load cell body which is a costly part of the on-board load weighing system.

It is therefore an object of this invention to provide an improved on-board load weighing system.

It is a further object of this invention to provide such an improved on-board load weighing system in which the number and frequency of occurrence of structural failures of the load cells therein is significantly reduced from that encountered with the systems of the prior art.

It is yet a further object of this invention to provide an improved load cell for use in on-board load weighting systems which has a decreased susceptibility of structural failure in normal operation, as compared with the load cells of the prior art.

It is another object of this invention to provide a means for reducing the number and frequency of occurrence of structural failures of load cells utilized in existing and new on-board load weighing systems.

SUMMARY OF THE INVENTION

The foregoing and other objects and advantages of the present invention are achieved, in one embodiment of the invention, by the provision of an improved load cell assembly providing part of an on-board load weighing system for a vehicle having a frame member and a load support member to which the load which is to be measured is applied. The load cell assembly is adapted to be located between the load support member and the frame member and includes an elongated beam means having a central portion and first and second ends. Means secure the respective first and second ends of the beam means to the frame member of the vehicle and elevate the central portion of the beam means above the frame member. Means are provided for securing the central portion of the beam means to the load support member.

To limit tensive forces in the load cell assembly to acceptable values, a restraining means is provided which limits deflection of the beam means in a direction toward the load support means.

In a preferred embodiment, the load cell assembly includes an elongated load concentrating means which is secured to the load support member and joined to the central portion of the beam means. The elongated load concentrating means in turn has first and second ends defining, in combination with the first and second ends of the beam means, a pair of slots extending inwardly from these ends for directing the applied load to the central portion of the beam means. A restraining means is accordingly provided which limits deflection of the first and second ends of the load concentrating means in a direction toward the load support means.

BRIEF DESCRIPTION OF THE DRAWINGS

The invention can perhaps be best understood by reference to the following portion of the specification, taken in conjunction with the accompanying drawings in which.

DESCRIPTION OF THE PREFERRED AND OTHER EMBODIMENTS

Figure 1:
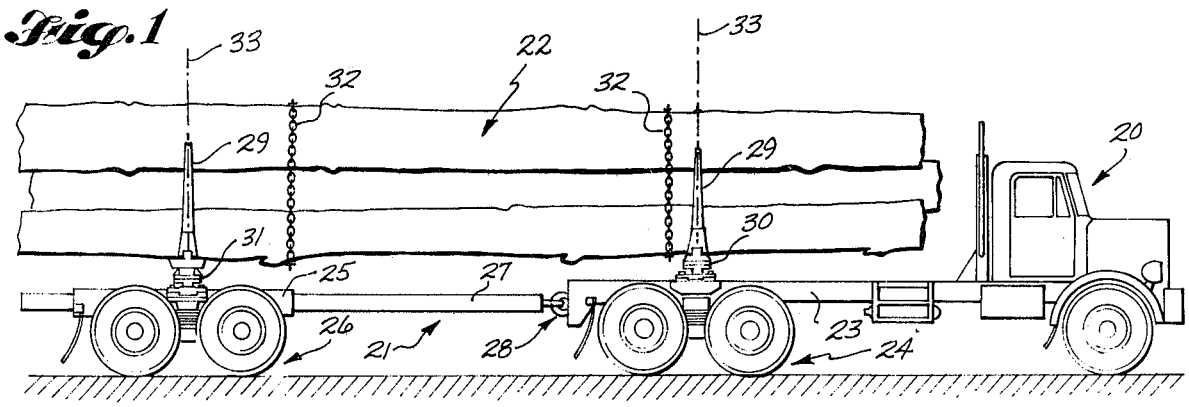
FIG. 1 is a pictorial illustration of a typical logging truck including an on-board load weighing system.

In FIG. 1, a logging truck or tractor 20 is illustrated which has attached thereto a logging trailer 21, the truck 20 and trailer 21 supporting in turn a typical load of logs 22. The truck 20 includes a truck frame 23 which is supported by a conventional wheel assembly 24 and the trailer 21 includes a trailer frame 25 which is supported by a wheel assembly 26. An elongated beam 27 is slidable in the trailer frame 25 and is pivotedly attached to the truck frame 23 by a hook-and-eye connection 28.

The load of logs 22 is wedged in and supported by load support members on the truck 20 and trailer 21 including stake assemblies 29 having horizontal bunk beams (not illustrated). The bunk beams are in turn coupled by conventional, rotatable cup-and-saucer assemblies, not illustrated, to bolster and load cell assemblies 30, 31 mounted, respectively, on the truck frame 23 and the trailer frame 25. Two load cells are provided in each of the bolster and load cell assemblies 30, 31 and located on opposite sides of the truck frame 23 and trailer frame 25. Securing of the load of logs 22 in an integral bundle is assured by chains 32 drawn tightly around the load of logs 22.

Under normal conditions, and particularly when the truck 20 and trailer 21 are situated on lever terrain, as illustrated in FIG. 1, the stake assemblies 29 extend vertically and are aligned with reference lines 33 drawn perpendicular to the truck frame 23 and trailer frame 25.

However, when the truck 20 and trailer 21 are situated on uneven terrain, such as the concavity or depression illustrated in FIG. 22, the stake assemblies 29 often will be forced to assume a position which is inclined from the reference lines 33. This inclination results from the fact that the load of logs 22 comprises an integral, unyielding bundle that is tightly wedged within the stake assemblies 29 so that frictional forces prevent the stake assemblies 29 from shifting with respect to the load of logs 22. The truck frame 23 and trailer frame 25, on the other hand, tend to follow the uneven terrain and pivot around hook-and-eye connection 28, although the truck frame 23 and trailer frame 25 do flex somewhat as a result of the forces exerted thereon by the stake assemblies 29 through the bolster and load cell assemblies 30, 31.

Figure 2:
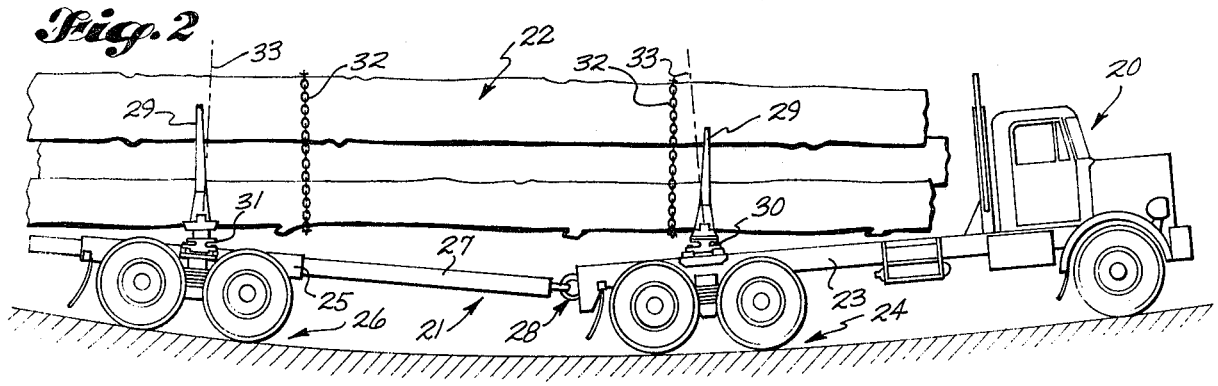
FIG. 2 is a pictorial illustration of the logging truck of FIG. 1, as situated on uneven terrain.

Accordingly, most of the inclination between the stake assemblies 29 and the reference lines 33 is reflected in rotation of the bolster and load cell assemblies 30 and 31. As illustrated in FIG. 2, bolster and load cell assembly 30 is rotated in a clockwise direction, while bolster and load cell assembly 31 is rotated in a counter-clockwise direction.

Figure 3:
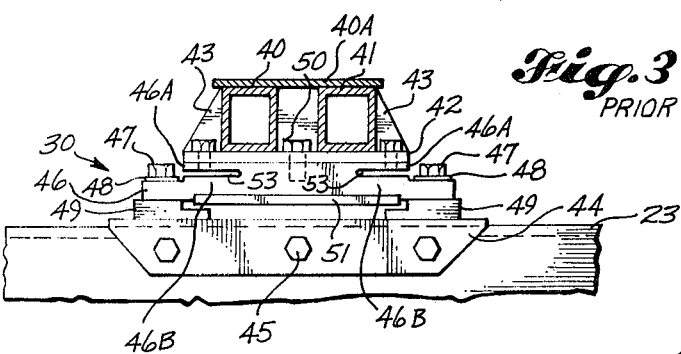
FIG. 3 is a side elevation of a typical load cell of the prior art, as installed between a load-carrying member and a truck frame of the logging truck, under the terrain conditions illustrated in FIG. 1.

The present invention rests upon the discovery that this rotation of the bolster and load cell assemblies 30, 31 is the single most important cause of load cell structural failures. In FIG. 3, a portion of a prior art bolster and load cell assembly 30 is illustrated in detail and seen to comprise a bridge beam including a pair of beams 40, 41, shown in cross section, which extend across the truck frame 23 and whose upper surfaces are welded to a plate 40A which supports the cup-and-saucer assembly connected to the stake assembly 29. The beams 40, 41 are supported in turn by a pair of load cells mounted on opposite sides of the truck frame 23, only one of which is illustrated. A flat pressure plate 42 is welded or otherwise affixed to the bottom surfaces of the beams 40 and 41. The ends of plate 42 are stiffened by gussets 43 welded between the beams 40, 41 and the pressure plate 42. As a result, the assembly including beams 40, 41, plate 40A, pressure plate 42 and gussets 43 is substantially rigid and capable of accommodating little flexure in any direction.

The truck frame 23, which is typically of aluminum, has located thereon an angle iron 44, secured to the truck frame by a plurality of fasteners 45, for supporting the bolster and load cell assembly 30. A load cell body 46 comprising a substantially rectangular steel block has an upper surface thereof secured to the bottom surface of the pressure plate 42 by a plurality of bolts 50 and in turn has respective right and left portions of its lower surface supported on bearings plates 49 which are welded to the angle iron 44. The load cell body 46 is maintained in position on the bearing plates 49 by a pair of bolts 47 passing through corresponding holes in the right and left ends of the load cell body 46 and received in corresponding threaded holes in the bearing plates 49, with the bolts 47 being tightened to apply pressure to the respective right and left ends of the load cell body 46 through interposed washer 48.

In the load cell illustrated in FIG. 3, slots 53 are formed in the right and left ends of the load cell body 46 so that the upper portion of the load cell body 46 functions as a load concentrating means to direct the load forces distributed along the pressure plate 42 to the central portion of the load cell body 46. It will be noted that the slots 53 accordingly define right and left ears 46A. By elevating the central portion of the load cell body 46 above the angle iron 44 by means of bearing plates 49, and accordingly restraining the right and left ends of the load cell body 46 by the bolts 47, the lower portion of the load cell body 46 below the slots 53 accordingly functions as right and left beams 46B which deflect in response to the applied load. The applied load is measured by a plurality of strain gages, not illustrated, located on a bottom surface of load cell body 46 and covered by a mud shield 51. Reference should be made to the aforementioned Harris patent for a detailed description of the mounting of the strain gages and their interconnection in circuit to provide an output signal proportional to applied load.

When the truck 20 is located on level terrain, the bolster and load cell assembly 30 appears as illustrated in FIG. 3, with the central portion of load cell body 46 deflecting downwardly with a beam configuration corresponding to the type of restraint afforded to the ends of the right and left beams by the end support means and fastening means such as bearing plates 49 and bolts 47. If the right and left ends of the load cell body are free to pivot on knife edges, the beams 46B deflect with a cantilever configuration; if the right and left ends are totally restrained, as by welding them to the end support means, the beams 46B deflect with an S-shaped configuration. For the load cell illustrated in FIG. 3, the resultant beam configuration under applied load is a hybrid of the cantilever and S-shaped configurations.

Figure 4:
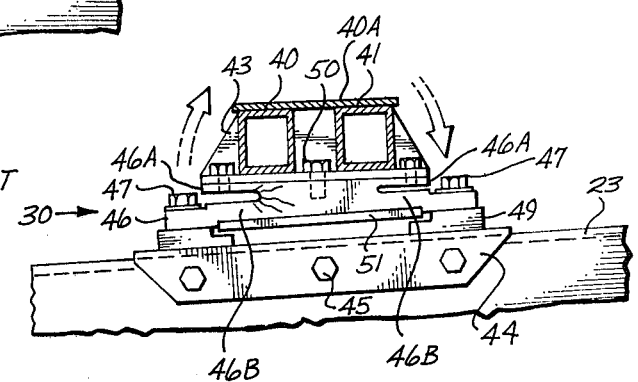
FIG. 4 is a side elevation of that typical load cell under the terrain conditions illustrated in FIG. 2.
Figure 5:
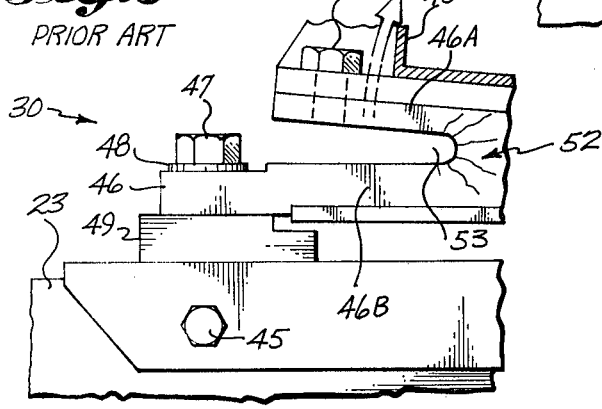
FIG. 5 is an enlarged side elevation of that typical load cell under the terrain conditions illustrated in FIG. 2.

When the truck 20 is on uneven terrain, the deflection of the load cell body 46 is modified by the rotational forces applied to the bolster and load cell assembly 30 caused by the inclination of the stake assemblies 29 previously described. With reference now to FIGS. 4 and 5, it is seen that the clockwise rotation of the bolster, including beams 40 and 41, is substantially taken up in the load cell body 46. In detail, the lower portion of the load cell body 46 is continued to be compressed by the applied load and accordingly deflects downwardly. However, the compressive force is shifted to the right end of the load cell body 46, resulting in a substantially increased compressive force thereon. In addition, the substantially rigid assembly including beams 40, 41 and pressure plate 42 pulls up on the left end of the load cell body 46 to place it in tension. As can be seen particularly in FIG. 5, the lower portion of the left end of the load cell body 46 is substantially restrained from upward movement by the compressive forces exerted by the bolt 47 and interposed washer 48. Accordingly, a substantial amount of the upward deflection of the load cell body 46 is located in the left ear 46A and the left beam 46B, resulting in high force concentrations in the vicinity of the termination of the slot 53. As a result, the endurance limit of the load cell body 46 in this region is often exceeded, with resultant fatigue and eventual structural failures starting as cracks 52 extending from the termination of the slot 53 inwardly into the load cell body 46. In some cases, these cracks 52 manifest themselves in total structural failure of the load cell, in which the ear 46A or beam 46B typically breaks away from the load cell body 46.

The present invention accordingly seeks to reduce the tensive force concentration in the region of the load cell body adjacent the slot termination, or in the region immediately adjacent the points where the load cell load concentrating means joins the central portion of the beam-defining portion of the load cell.

Figure 6:
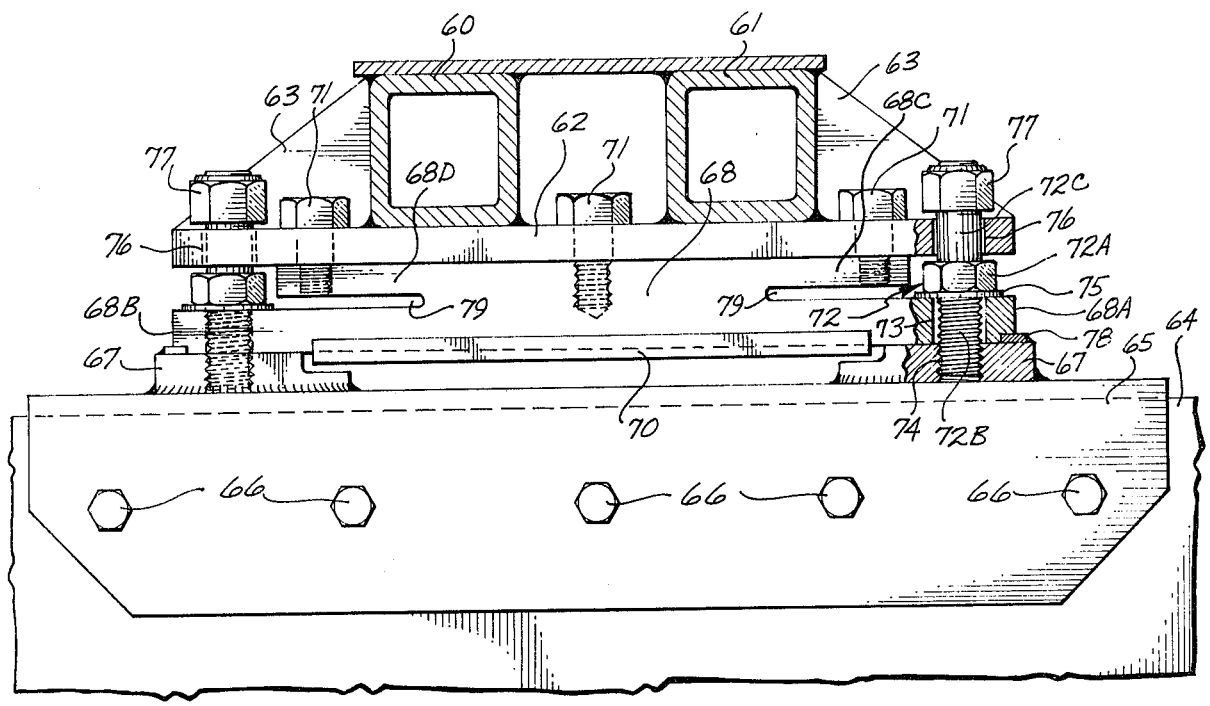
FIG. 6 is a side elevation of a load cell in combination with a preferred embodiment of the present invention as installed in conjunction with a logging truck tractor.
Figure 7:
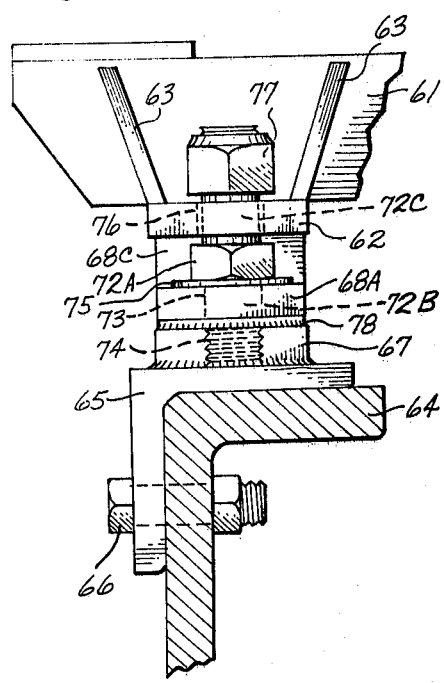
FIG. 7 is a right-end elevation corresponding to FIG. 6.

Referring now to FIGS. 6 and 7, a bolster and load cell assembly also includes beams 60, 61 rigidly secured, by welding or otherwise, to a pressure plate 62, with additional supports being provided by gussets 63.

A truck frame 64 supports an angle iron 65 which is attached thereto by a plurality of fasteners 66. Welded to the angle iron 65 are a pair of bearing plates 67 which support respective right and left beam ends 68A, 68B of a load cell body 68. Also included in load cell body 68 are right and left ears 68C, 68D of a load concentrating means, defined in part by a pair of slots 79 in the load cell body 68. A mud shield 70 is provided on a lower longitudinal surface of load cell body 68 for protecting a plurality of strain gages located thereon in a conventional manner. The pressure plate 62 is secured to the top surface of the load cell body 68 by a plurality of bolts 71, but differs from the pressure plate of the prior art in that it is extended in a direction parallel to the length of the truck frame 64 over the respective ears 68C, 68D to overlie the respective right and left beam ends 68A, 68B. It will be further noted that the gussets 63 extend to and therefore stiffen the extended ends of pressure plate 62.

With reference now to the right end of the bolster and load assembly (the left end being identical in construction), the right beam end 68A is secured to the bearing plate 67 by a double-shafted bolt 72 having a head 72A and a first threaded shaft 72B extending through a hole 73 in right beam end 68A and received in a threaded hole 74 in bearing plate 67, with head 72A being tightened to apply pressure to the top surface of right beam end 68A through an interposed washer 75.

The double-shafted bolt 72 also includes a second threaded shaft 72C extending in a direction from head 72A opposite to that of threaded shaft 72B and passing through an enlarged hole 76 in pressure plate 62. A lock nut 77 is threaded onto the portion of second threaded shaft 72C extending above the top surface of pressure plate 62 to a point just above but separated from the top surface of pressure plate 62.

The assembly is completed by shear stops 78 comprising flat metal strips which are welded to top surfaces of bearing plate 67 and received in corresponding niches in right and left beam ends 68A, 68B. The shear stops 78 function to limit the longitudinal movement of the load cell body 68 in response to applied shear or longitudinal forces thereon.

Those skilled in the art will appreciate that, at some point in the rotation of the bolster including beams 60, 61, pressure plate 62 and gusset 63, the top surface of pressure plate 62 will come into contact with the bottom surface of lock nut 77, as hole 76 in pressure plate 62 is enlarged so as to permit relative movement of pressure plate 62 with respect to the second threaded shaft 72C. Accordingly, the upward deflection and rotation of pressure plate 62, and therefore of right ear 68C, and the right beam terminating in right beam end 68A, will be limited to that afforded by the unloaded separation between pressure plate 62 and lock nut 77 on level terrain. This separation may be chosen to allow only that level of tensive force to be built up in ear 68C which is within the tensile strength of the material of load cell body 68. When the pressure plate 62 and lock nut 77 come into contact, the pressure plate 62 is inhibited from further rotation to accordingly keep the deflection of ear 68C and the right beam within safe limits. Some separation between lock nut 77 and pressure plate 62 under unloaded conditions must be provided, however, to prevent interactions between those elements which could affect the accuracy of weighing.

Figure 8:
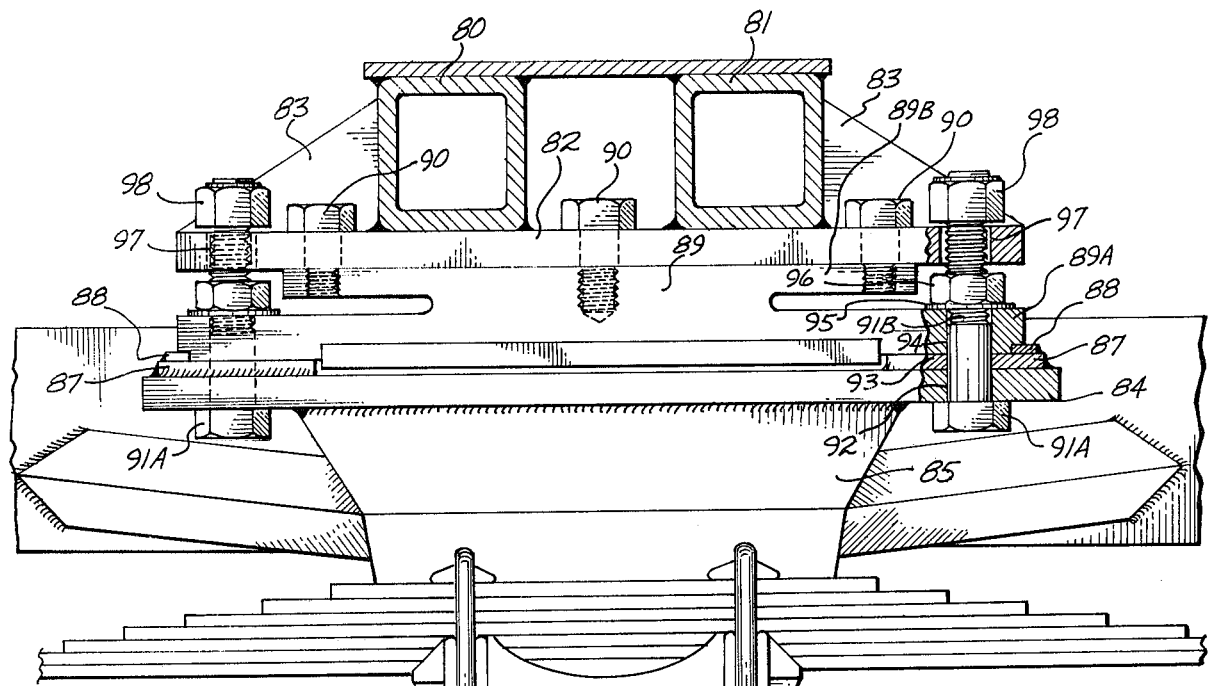
FIG. 8 is a side elevation of a load cell in combination with a preferred embodiment of the present invention as installed in conjunction with a logging truck trailer.
Figure 9:
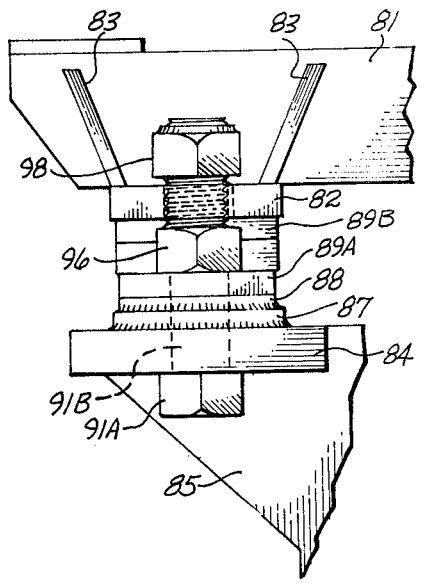
FIG. 9 is a right-end elevation corresponding to FIG. 8.

Of course, the rotational displacement which is limited in the bolster and load cell assembly must be accommodated in other parts of the log truck structure, such as the cup-and-saucer assembly and the vehicle frame, as well as remaining structural elements which, fortunately, are capable of withstanding the resultant tensive forces, in distinction to the load cell body 68. As a result, structural failures in the load cells caused by the rotational displacement occurring under uneven terrain conditions are greatly reduced in both number and in frequency of occurrence. FIGS. 8 and 9 illustrate the application of the preferred embodiment of the invention to a trailer-mounted bolster and load cell assembly, such as assembly 31 in FIG. 1. A pair of beams 80, 81 are again provided and welded to a pressure plate 82 having extended ends, with supporting gussets 83. A support plate 84 is welded to a bracket 85 forming part of the trailer frame which is supported by a suspension assembly 86 and has welded thereto a pair of bearing plates 87, with shear stops 88, supporting right and left ends of a load cell body 89 whose top surface is secured to the pressure plate 82 by a plurality of bolts 90. The right beam 89A of the load cell body 89 is secured to the corresponding bearing plate 87 by a bolt 91 having a head 91A located below the bottom surface of support plate 84 and a threaded shaft 91B extending through corresponding holes 92, 93 and 94 in support plate 84, bearing plate 87, and right beam end 89A, respectively. Compressive force is exerted on the right beam end 89A by a nut 96 threaded onto shaft 91B and bearing against the top surface of right beam end 89A through an interposed washer 95.

The threaded shaft 91B also extends through an enlarged hole 97 in the extended end of pressure plate 82, with a lock nut 98 being threaded on shaft 91B to a point above and separated from the top surface of pressure plate 82.

As with the structure illustrated with respect to FIGS. 6 and 7, the upward rotation and deflection of pressure plate 82 is limited to an amount determined by the unloaded separation between pressure plate 82 and lock nut 98.

Figure 10:
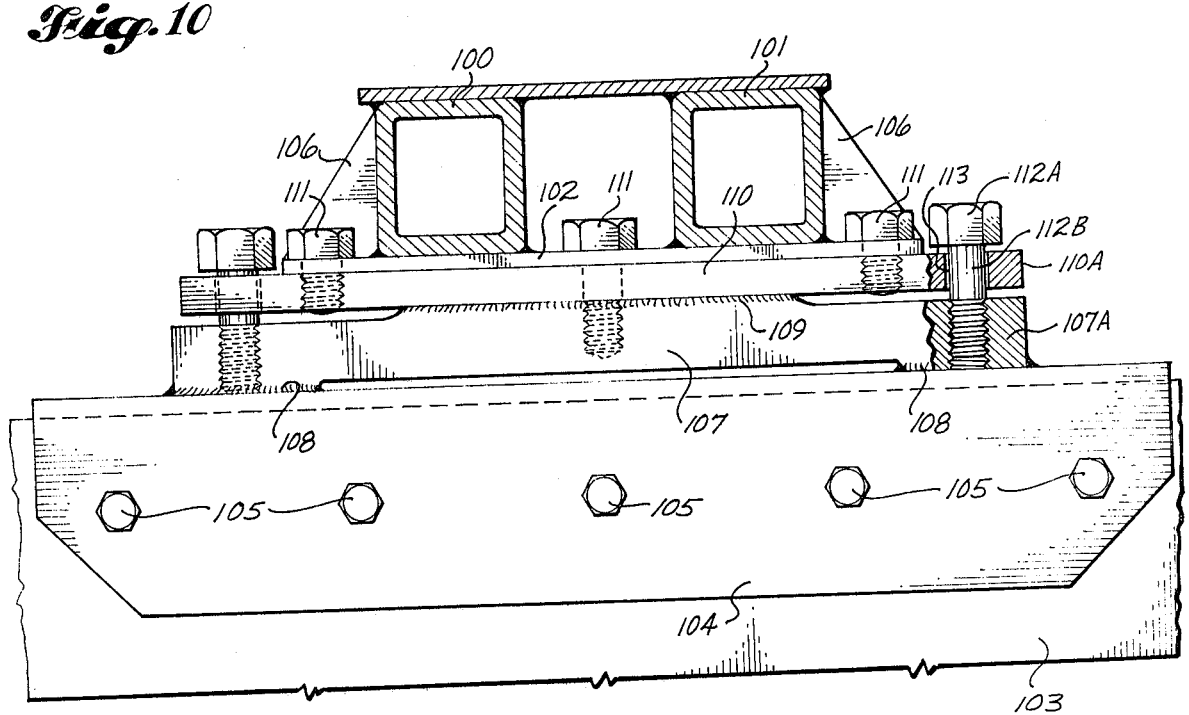
FIG. 10 is a side elevation of another type of installed load cell known to the prior art, as modified with the present invention.
Figure 11:
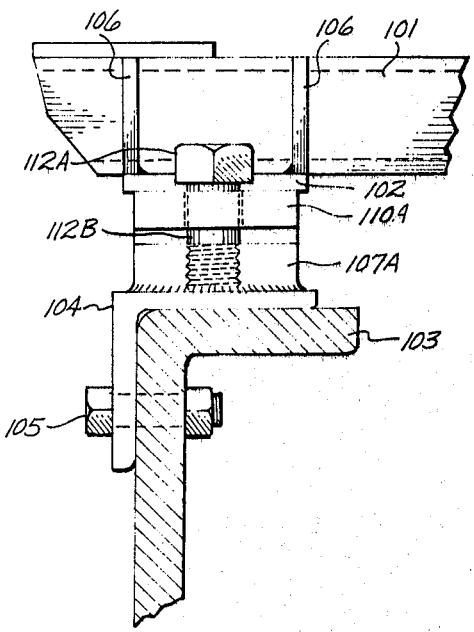
FIG. 11 is a right-end elevation corresponding to FIG. 10.

FIGS. 10 and 11 illustrate an application of the invention to a slightly different load cell commonly used in on-board load weighting systems. Again, beams 100 and 101 are secured to a pressure plate 102, by welding or otherwise, with gussets 106 also being provided. An angle iron 104 is supported by the truck frame 103 and secured thereto by a plurality of fasteners 105 and has welded thereto right and left feet 108 of a double-beam load cell body 107. Included in the body 107 is a central, raised land portion 109 which has welded thereto a top plate 110 secured, by bolts 111, to the pressure plate 102.

It will be appreciated by those skilled in the art that the load cell in FIGS. 10 and 11 is equivalent to the type previously described, with the central, raised land portion 109 creating relief areas or "slots" at either side thereof between the bottom surface of top plate 110 and the adjacent top surface of load cell body 107, so that right and left beams are defined in load cell body 107 with the applied load being directed to the central portion of body 107 through land portion 109. In practice, structural failures have been observed with respect to the load cell in FIG. 10 at exactly the same points as with the load cells previously described, that is, closely adjacent to the inward termination of the "slots". Most typically, one of the "ears", included in top plate 110 to either side of the land portion 109, will break, or a crack will appear starting at the top surface of load cell body 107 to the right or left of land portion 109. Cracks also often appear at the ends of the weld between top plate 110 and land portion 109, and at the inward termination of the welds between feet 108 and angle iron 104.

Accordingly, the top plate 110 is extended beyond that known to the prior art (that terminating coextensive with pressure plate 102) to overlie the respective beam ends of the load cell body 107. With respect to the right beam end 107A, the top plate 110 has an extended end 110A. A bolt 112 is provided having a head 112A and a threaded shaft 112B which passes through an enlarged hole 113 in extended end 110A and which is received in a threaded hole 114 in beam end 107A. The bottom surface of head 112A is just above but separated from the top surface of extended end 110A to limit the upward rotation and deflection of top plate 110 and the right beam terminating in right beam end 107A. It will be readily appreciated that this concept of extending the "ears" of the load cell applies equally as well to the load cells previously described, where those load cells are to be welded, rather than bolted, to a supporting member such as the angle iron affixed to the truck frame.

Figure 12:
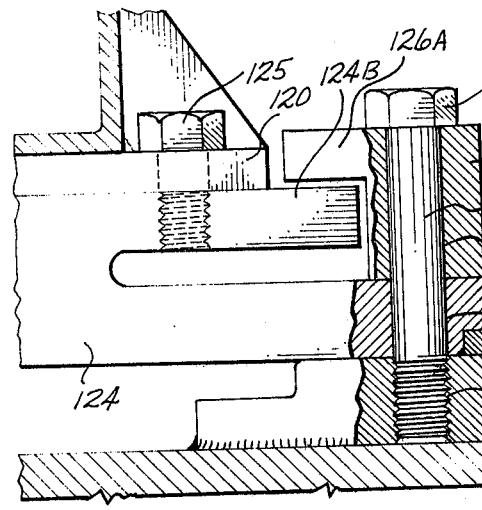
FIG. 12 is a partial side elevation of an installed load cell illustrating another embodiment of the invention.
Figure 13:
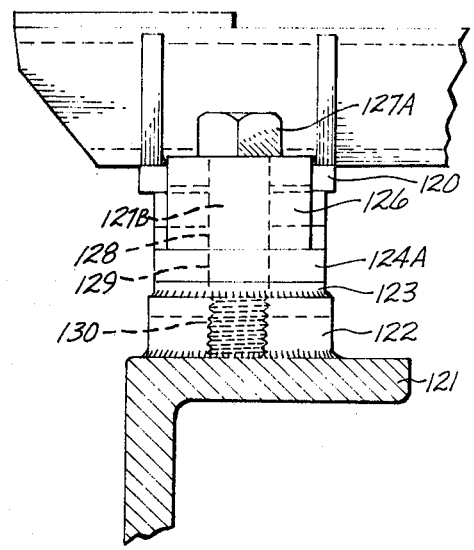
FIG. 13 is a right-end elevation corresponding to FIG. 12.

Another embodiment of the invention is seen in FIG. 12 and 13 in which a pressure plate 120, a frame 121, a bearing plate 122, a shear stop 123, and a load cell body 124 similar to those previously described with reference to FIGS. 6-9 are provided. The load cell body 124, however, is distinguished in having an extended ear 124B in the right side of the load cell body also including a right beam end 124A. A plurality of fasteners 125 affix the pressure plate 120 to the load cell body 124. A caging block 126 is provided which includes a lip 126A overlying the extended ear 124B, the assembly being made by a bolt 127 having a head 127A with a threaded shaft 127B passing through holes 128 and 129 in caging block 126 and right beam end 124A and received in a threaded hole 130 in bearing plate 122. Upward deflection of the ear 124B is limited to that afforded by the separation between the upper surface thereof and the lower surface of lip 126A.

Figure 14:
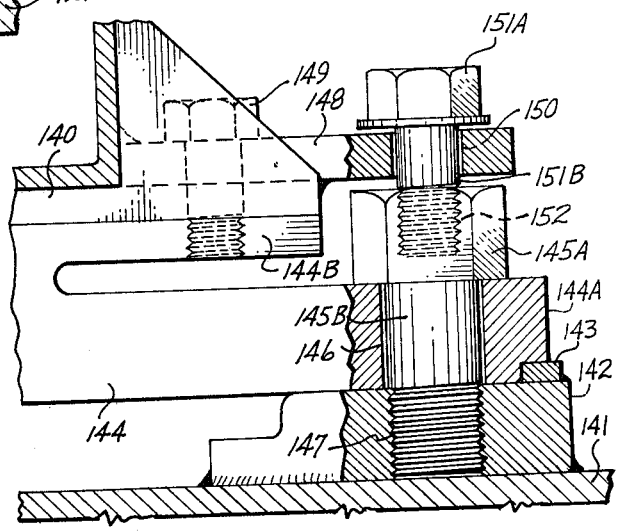
FIG. 14 is a partial side elevation of an installed load cell illustrating an embodiment of the invention suitable for modification of existing on-board load weighing systems.
Figure 15:
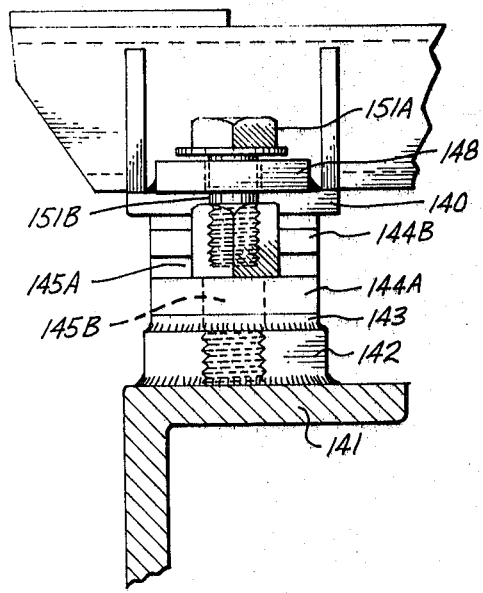
FIG. 15 is a right-end elevation corresponding to FIG. 14.

In FIGS. 14 and 15, an embodiment of the invention suitable for retrofit of on-board load weighing systems or installations is seen which again includes a pressure plate 140, a frame 141, a bearing plate 142, a shear stop 143 and a load cell body 144 having a right beam end 144A and a right ear 144B similar to that previously described with respect to FIGS. 6 and 7, with a plurality of fasteners 149 securing the pressure plate 140 to the load cell body 144.

A special bolt 145 is provided for securing the right beam end 144A, the bolt 145 including an enlarged head 145A and a threaded shaft 145B extending through a hole 146 in right beam end 144A and received in a threaded hole 147 in bearing plate 142. A caging plate 148 is secured to a top surface of pressure plate 140 by welding, and also by one of the plurality of bolts 149 passing therethrough, and extends over the right beam end 144A. Upward deflection of the pressure plate 140 is then limited by a bolt 151 having a head 151A whose bottom surface is apart from but adjacent to the top surface of caging plate 148, and a shaft 151B passing through an enlarged hole 150 in caging plate 148 and received in a threaded hole 152 located in the head 145A of bolt 145.

Figure 16:
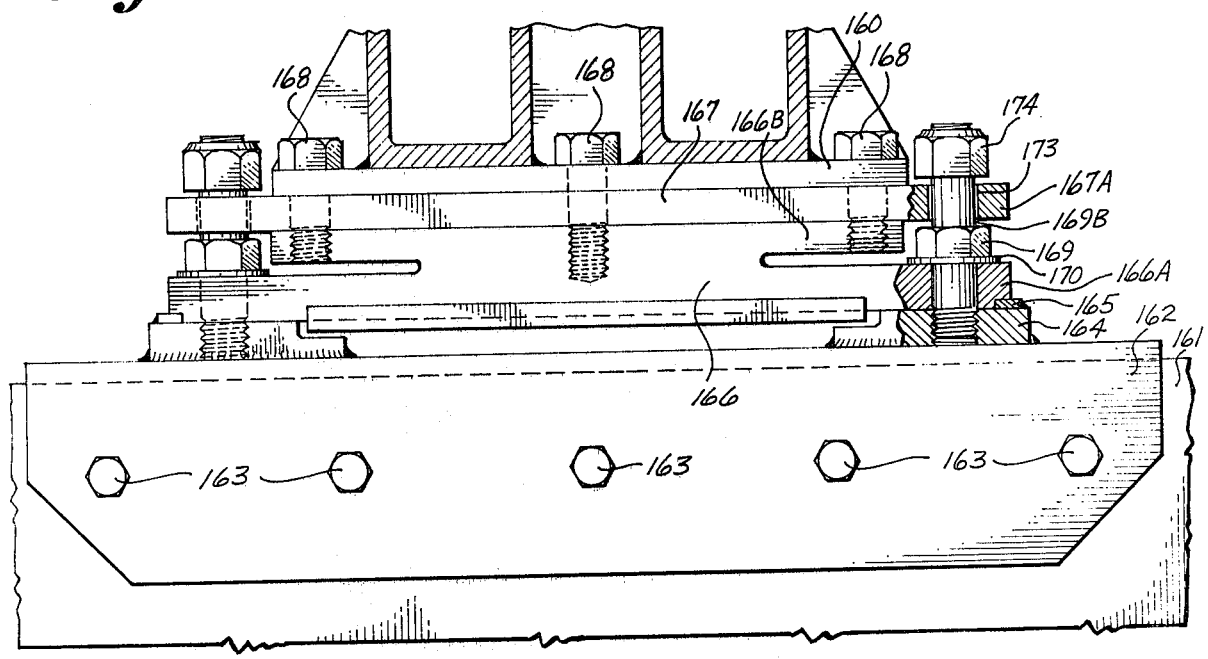
FIG. 16 is a side elevation of an installed load cell illustrating a second embodiment of the invention suitable for modification of existing on-board load weighing systems.
Figure 17:
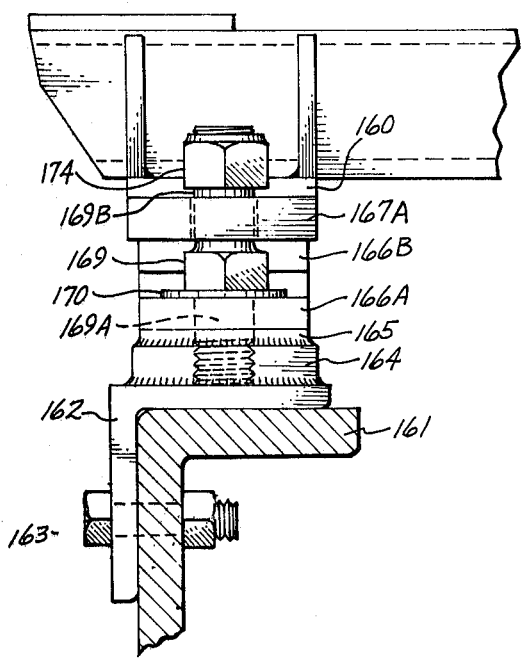
FIG. 17 is a right-end elevation corresponding to FIG. 16.

FIGS. 16 and 17 illustrate another embodiment of the invention suitable for retrofit. The pressure plate 160, frame 161, angle iron 162, plurality of fasteners 163, bearing plate 164, shear stop 165, and load cell body 166 are similar to that previously described with respect to FIGS. 6 and 7. In this embodiment, however, the pressure plate 160 is separated from the top surface of the load cell body 166 by an extended caging plate 167 having a longitudinal dimension substantially the same as load cell body 166 and including an end 167A extending beyond right ear 166B and overlying right beam end 166A of load cell body 166. A plurality of bolts 168 secure together the pressure plate 160, the caging plate 167 and the load cell body 166.

A double-shafted bolt 169 is provided having a first shaft 169A extending through a hole 171 in right beam end 166A and received in a threaded hole 172 in bearing plate 164, and an opposite, second threaded shaft 169B extending through an enlarged hole 173 in caging plate 167 and extending above the top surface thereof. A lock nut 164 is threaded onto the shaft 169B to provide the restraining function.

While the invention has been described with reference to a preferred embodiment and several other embodiments, it is to be clearly understood by those skilled in the art that the invention is not limited thereto, but rather that the scope and extent of the invention is to be interpreted in accordance with the appended claims.

What is claimed is:

1. In a load cell assembly providing part of an on-board load weighing system for a vehicle having a frame member and a load support member to which the load which is to be measured is applied, the load cell assembly being adapted to be located between the load support member and the frame member and including elongated beam means having a central portion and first and second ends, means for securing the first and second ends of the beam means to the frame member of the vehicle and for elevating the central portion of the beam means above the frame member, elongated load concentrating means to be secured to the load support member and integral with the central portion of the beam means and having first and second ends defining, in combination with the first and second ends of the beam means, a pair of slots extending inwardly from said ends for directing the applied load to the central portion of the beam means, an improvement comprising:
restraining means to be secured to the frame member for limiting deflection of the first and second ends of the load concentrating means in a direction toward the load support means.

2. An improvement as recited in claim 1, wherein said restraining means includes first means for overlying but being separated from said first and second ends of the load concentrating means.

3. An improvement as recited in claim 2, wherein said first means comprises first and second caging blocks having respective lips for overlying the first and second ends of the load concentrating means, and further including second means for securing said first and second caging blocks to the respective first and second ends of the beam means.

4. An improvement as recited in claim 1 wherein said restraining means comprises first and second plate members for respective securement to the first and second ends of the load concentrating means, and means for overlying but being separated from said first and second plate members and to be secured to the frame member.

5. An improvement as recited in claim 4, wherein said first and second plate members define holes extending therethrough, said holes each having a predetermined diameter and wherein said overlying means comprises first and second fastener means each having a first portion whose diameter is greater than that of said holes in said first and second plate members and a second, shaft portion whose diameter is less than that of said holes, and means in the first and second ends of the beam means for receiving said shaft portions so that said shaft portions extend through said holes in said first and said second plate members with said first portions being situated above said first and said second plate members in assembly.

6. An improved load cell assembly for inclusion in an on-board load weighing system for a vehicle having a frame member and a load support member to which the load which is to be measured is applied, the load cell assembly being adapted to be located between the load cell support member and the frame member and including: elongated beam means having a central portion and first and second ends; means securing said first and said second ends of said beam means to the frame member of the vehicle and elevating said central portion of said beam means above the frame member; elongated load concentrating means secured to the load support member and intergral with the central portion of said beam means and having first and second ends defining, in combination with said first and second ends of said beam means, a pair of slots extending inwardly from said ends for directing the applied load to the central portion of said beam means; and, restraining means secured to the frame member for limiting deflection of said first and said second ends of said load concentrating means in a direction toward the load support means.

7. An improved load cell assembly as recited in claim 6, wherein said restraining means comprises: elongated plate means to be located between said load concentrating means and the load support member; means securing together said elongated plate means, said load concentrating means, and the load support member; said elongated plate means having first and second ends adapted for extending, in assembly, beyond said first and second ends of said load concentrating means and for overlying said first and second ends of said beam means, said elongated plate means further having defined therein holes through said first and second ends, said holes having a predetermined diameter; first and second fastener means, each having a first portion whose diameter is greater than that of said holes in said elongated beam means, and a second, shaft portion whose diameter is less than that of said holes in said elongated beam means; and means in said first and second ends of said beam means receiving said shaft portions so that said shaft portions extend through said holes with said first portions being situated above said elongated plate means.

8. An improved bolster and load cell assembly for inclusion in an on-board weighing system for a vehicle having a frame member and a load support member to which the load which is to be measured is applied, the bolster and load cell assembly including: an elongated pressure plate affixed to and forming part of the load support member; a load cell assembly adapted to be located between said pressure plate and the frame member and including an elongated beam means having a central portion and first and second ends, and means securing said first and second ends of said beam means to the frame member of the vehicle and elevating said central portion of said beam means above the frame member; an elongated load concentrating means secured to said pressure plate and intergral with the central portion of said beam means and having first and second ends defining, in combination with said first and second ends of said beam means, a pair of slots extending inwardly from said ends for directing the applied load to said central portion of said beam means, said elongated pressure plate having first and second ends extending beyond said first and second ends of said load concentrating means in assembly and overlying said first and second ends of said beam means, said pressure plate further having defined therein holes extending therethrough in said first and second ends; first and second fastener means, each having a first portion which is enlarged with respect to the diameter of said holes in said elongated beam means and a second, shaft portion which has a diameter less than that of said holes in said elongated beam means; and means in said first and said second ends of said beam means receiving said shaft portions so that said shaft portions extend through said holes in said pressure plate with said first portions being situated above said pressure plate.

* * * * *

UNITED STATES PATENT AND TRADEMARK OFFICE
CERTIFICATE OF CORRECTION

PATENT NO. : 4,095,659

DATED : June 20, 1978

INVENTOR(S) : Carl Blench et al.

It is certified that error appears in the above-identified patent and that said Letters Patent are hereby corrected as shown below:

Column 1, line 13: "weighting" is changed to —weighing—.

Column 1, line 64: "weighting" is changed to —weighing—.

Column 3, line 46: "lever" is changed to —level—.

Column 7, line 26: "weighting" is changed to —weighing—.

Signed and Sealed this

Third Day of April 1979

[SEAL]

Attest:

RUTH C. MASON
*Attesting Officer*

DONALD W. BANNER
*Commissioner of Patents and Trademarks*